United States Patent
Uwazumi et al.

(10) Patent No.: US 6,770,388 B2
(45) Date of Patent: Aug. 3, 2004

(54) PERPENDICULAR MAGNETIC RECORDING MEDIUM

(75) Inventors: Hiroyuki Uwazumi, Nagano (JP); Teruhisa Yokosawa, Nagano (JP)

(73) Assignee: Fuji Electric Co., Ltd. (JP)

(*) Notice: Subject to any disclaimer, the term of this patent is extended or adjusted under 35 U.S.C. 154(b) by 0 days.

(21) Appl. No.: 10/209,674

(22) Filed: Jul. 31, 2002

(65) Prior Publication Data

US 2003/0064251 A1 Apr. 3, 2003

(30) Foreign Application Priority Data

Jul. 31, 2001 (JP) ........................................ 2001-232785

(51) Int. Cl.⁷ ............................ G11B 5/66; G11B 23/00
(52) U.S. Cl. ................... 428/694 SG; 428/65.3; 428/141; 428/694 TM; 360/131; 369/288
(58) Field of Search .......................... 360/55, 58, 61, 360/77.01, 77.02, 77.03, 77.04, 135, 318; 369/272, 277, 278, 283, 288, 111, 112.01, 13.02, 13.07, 13.09; 428/64.1, 64.2, 65.3, 141, 410, 694 R, 694 SG, 694 TM, 694 ML, 694 T, 694 TR, 694 BR, 900

(56) References Cited

U.S. PATENT DOCUMENTS

| | | | |
|---|---|---|---|
| 5,108,781 A | * | 4/1992 | Ranjan et al. ........ 428/694 SG |
| 5,402,278 A | * | 3/1995 | Morita ....................... 360/55 |
| 5,486,967 A | * | 1/1996 | Tanaka et al. ............... 360/318 |
| 5,703,733 A | * | 12/1997 | Suzuki et al. ................ 360/55 |
| 5,993,937 A | * | 11/1999 | Birukawa et al. ...... 428/694 RE |
| 6,013,336 A | * | 1/2000 | Baumgart et al. .......... 360/135 |
| 6,051,299 A | * | 4/2000 | Uchiyama et al. .......... 369/277 |
| 6,096,445 A | * | 8/2000 | Terakado et al. ..... 428/694 TR |
| 6,132,843 A | * | 10/2000 | Kuroda et al. .............. 428/410 |
| 6,144,517 A | * | 11/2000 | Watanabe et al. ........ 360/77.04 |
| 6,556,516 B1 | * | 4/2003 | Shimazaki et al. ...... 369/13.02 |
| 6,628,574 B1 | * | 9/2003 | Shimazaki et al. ...... 369/13.09 |

FOREIGN PATENT DOCUMENTS

| | | |
|---|---|---|
| JP | 3-228219 | 10/1991 |
| JP | 7-153047 | 6/1995 |
| JP | 07-153047 | * 6/1995 |

* cited by examiner

Primary Examiner—Stevan A. Resan
Assistant Examiner—Louis Falasco
(74) Attorney, Agent, or Firm—Rossi & Associates

(57) ABSTRACT

A perpendicular magnetic recording medium has a nonmagnetic substrate having concave portions and a soft magnetic layer on the nonmagnetic substrate. The depth of the concave portion and the thickness of the soft magnetic layer are larger than at least the length and the width of the concave portion such that the easy axis of magnetization in the regions of the soft magnetic layer in the concave portions is oriented perpendicular to the soft magnetic layer due to shape magnetic anisotropy. The easy axis of magnetization oriented perpendicular to the soft magnetic layer facilitates signal generation. The recording medium does not use the magnetization of the magnetic recording layer for such signal generation, which can be head positioning signals or other signals, such as copyright data. Instead, it uses the magnetization in the concave regions of the soft magnetic layer for such signal generation.

8 Claims, 2 Drawing Sheets

PERPENDICULAR MAGNETIC RECORDING MEDIUM

BACKGROUND

Conventional magnetic recording media, such as magnetic disks, which record and reproduce digital data through a magnetic head, are initialized one by one in a servo writer. For example, the servo writer writes positioning signals on a magnetic disk through a magnetic head incorporated in the servo writer. The magnetic disk is initialized to improve the servo tracking performance of the magnetic head.

A very precise tracking facilitates to accurately record a digital data signal on a predetermined track and reproduce the digital data signal from the predetermined track even when the track density of the magnetic disk used in a magnetic disk drive is high. Therefore, the very precise tracking facilitates to improve the recording capacity of the magnetic disk.

The positioning signals are recorded on a magnetic disk by a sector servo method or by an embedding servo method. In the magnetic disk that employs the sector servo method, each track is divided in the extending direction thereof into a plurality of sectors, and the positioning signals are written at the head positions of the respective sectors. In the magnetic disk that employs the embedding servo method, positioning servo signals are written in advance in the deep layer of the magnetic film and data signals in the surface layer of the magnetic film.

Japanese Unexamined Laid Open Patent Application H03 (1991)-228219 discloses a magnetic disk including a nonmagnetic substrate having an uneven level pattern and a magnetic layer having concave regions and convex regions following the uneven level pattern of the nonmagnetic substrate, and magnetized in the different directions. This magnetic disk, on which a magnetization inversion pattern for reading out the signals is formed at the precision of the uneven level patterning, facilitates to improve the track density. For parallel magnetization of the magnetic disk described above, the concave regions and the convex regions of the soft magnetic layer are magnetized accurately in the respective predetermined directions by applying magnetic fields in the opposite directions using a magnetic head having a wide gap and a magnetic head having a narrow gap. Therefore, this magnetic disk facilitates easy manufacture thereof and improvement of the positioning accuracy. Protection and management of the recorded data are facilitated by recording the copyright data in the medium in advance as well as by using the uneven level pattern for the head positioning signals.

The perpendicular magnetic recording method, which facilitates increasing the line recording density, has been employed to realize high recording density on the magnetic disk. The perpendicular magnetic recording method records data by magnetizing the magnetic recording layer perpendicular thereto. The magnetic disk for perpendicular magnetic recording includes a soft magnetic layer with a high magnetic permeability formed below the magnetic recording layer so that the magnetic field generated from the magnetic head at the time of recording can be applied effectively perpendicular to the magnetic recording layer. Since the magnetic flux generated from the magnetic head localizes to the soft magnetic layer, a strong magnetic field is applied perpendicular to the magnetic recording layer. For obtaining a magnetic field strong enough to facilitate recording and for preventing signal distortion at the time of reproduction, it is necessary to orient the magnetization in the soft magnetic layer parallel thereto, especially toward the radial direction of the magnetic disk. The easy axis of magnetization of the soft magnetic layer is oriented parallel to the soft magnetic layer, especially to the radial direction of the magnetic disk, by applying a magnetic field or by such a method during the formation of the soft magnetic layer.

Japanese Unexamined Laid Open Patent Application H07 (1995)-228219 discloses a higher recording density attained by combining the foregoing track density increase by the uneven level pattern on the substrate and the recording line density increase by the employment of the perpendicular magnetization method. Prior to using the magnetic disk, the concave regions and the convex regions of the magnetic recording layer are magnetized in the same direction (e.g., upward) by applying a relatively strong magnetic field perpendicular to the magnetic recording layer and, then, the convex regions are magnetized in the opposite direction (downward) by applying a relatively weak magnetic field in the opposite direction.

For improving the resolutions at the time of recording and at the time of reproduction corresponding to the improved recording density, it is necessary even for the perpendicular magnetic recording method to set the spacing or gap between the magnetic head and the magnetic recording medium to be narrower than several tens nm. Especially for improving the sharpness of the perpendicular magnetic field generated from the magnetic head at the time of recording, it is effective to narrow the spacing between the pole tip of the magnetic head and the soft magnetic layer, not only by narrowing the spacing between the magnetic head and the magnetic recording medium, but also by thinning the protection layer and the magnetic recording layer as much as possible. Since the magnetic flux generated from the magnetic head localizes to the soft magnetic layer almost without being attenuated, it is obviously very difficult not to invert the magnetization in the concave regions of the magnetic recording layer but to invert the magnetization in the convex regions of the magnetic recording layer even when an uneven level pattern is formed on the nonmagnetic substrate and the strength of the applied magnetic field applied is adjusted optimally.

Accordingly, there still remains a need to provide a perpendicular magnetic recording medium that obviates the problems described above. The present invention addresses this need.

SUMMARY OF THE INVENTION

The present invention relates to a perpendicular magnetic recording medium mountable on various kinds of magnetic storage, such as an external storage of a computer.

According to one aspect of the invention, the perpendicular magnetic recording medium includes a nonmagnetic substrate, a soft magnetic layer on the nonmagnetic substrate, a magnetic recording layer above the soft magnetic layer, and a protection layer on the magnetic recording layer. The magnetic recording layer has perpendicular magnetizations that extend perpendicular to the major surface or plane thereof and representing data signals. The nonmagnetic substrate has concave portions that form an uneven level pattern thereon. The concave portions can generate a magnetic flux for detecting a predetermined signal based on the magnetization in the region of the soft magnetic layer in the concave portion of the nonmagnetic substrate. Hereinafter, the region of the soft magnetic layer in the concave portion of the nonmagnetic substrate will be referred to as the "concave region of the soft magnetic layer."

The depth of the concave portion and the thickness of the soft magnetic layer are larger than at least the length and the depth of the concave portion, and the easy axis of magnetization in the concave region of the soft magnetic layer lies perpendicular to the major surface of the perpendicular magnetic recording medium due to shape magnetic anisotropy. The cross sectional area of the concave portion along the major surface of the perpendicular magnetic recording medium can be narrower toward the bottom thereof. The predetermined signal can be a head positioning signal or a signal indicating copyright data for example.

The magnetic recording medium according to the invention does not utilize the magnetization in the magnetic recording layer, but utilizes the magnetization in the concave regions of the soft magnetic layer, when the magnetic recording medium uses the uneven level pattern on the nonmagnetic substrate for the predetermined signal, such as a head positioning signal and a signal indicating the copyright data or other data. This specific feature of the magnetic recording medium according to the invention facilitates using the magnetic fluxes generated from the concave regions of the soft magnetic layer as the predetermined signals. When the concave portion of the nonmagnetic substrate has a predetermined shape, the magnetic flux generated from the concave region of the soft magnetic layer can be used as the predetermined signal since the easy axis of magnetization in the concave regions of the soft magnetic layer lies perpendicular to the soft magnetic layer due to the shape magnetic anisotropy.

Since the magnetization in the region of the soft magnetic layer outside the concave portions of the nonmagnetic substrate lies parallel to the soft magnetic layer, the magnetic head does not detect the magnetic flux from the region of the soft magnetic layer outside the concave portions. Therefore, only the magnetic flux from the concave region of the soft magnetic layer is detectable as a signal. Since the magnetic flux from the concave region of the soft magnetic layer is larger than the magnetic flux from the magnetic recording layer, the signals corresponding to the uneven level pattern are detected not by the state of magnetization in the magnetic recording layer, but by the state of magnetization in the soft magnetic layer.

The magnetic recording medium according to the invention having the structure as described above is advantageous since the magnetization in the concave region of the soft magnetic layer and the magnetization in the entire magnetic recording layer are oriented perpendicular to the major surface or plane of the magnetic recording medium (upward or downward) and the magnetization in the region of the soft magnetic layer outside the concave portions of the nonmagnetic substrate is oriented parallel to the soft magnetic layer (along the easy axis of magnetization) only by applying a magnetic field perpendicular to the plane of the magnetic recording medium (upward or downward) and by removing the magnetic field to magnetically write the signals corresponding to the uneven level pattern on the magnetic recording medium.

DETAILED DESCRIPTION

Now the invention will be described in detail hereinafter with reference to the accompanied drawing figures, which illustrate the preferred embodiments of the invention.

Figure 1:
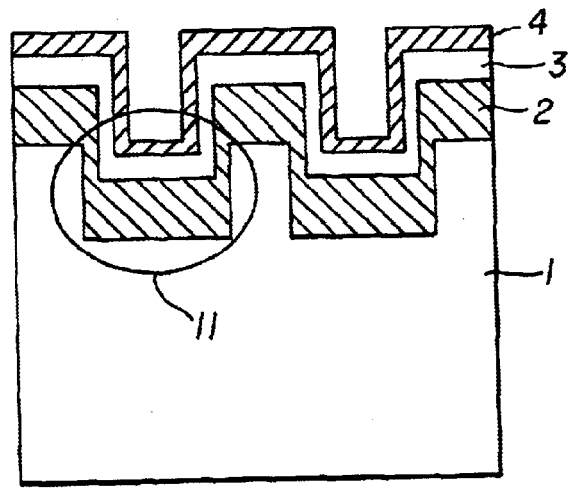
FIG. 1 is a schematic cross sectional view of a perpendicular magnetic recording medium according to a first embodiment of the invention.

FIG. 1 is a schematic cross sectional view of a perpendicular magnetic recording medium according to a first embodiment of the invention. The perpendicular magnetic recording medium according to the first embodiment includes a nonmagnetic substrate 1 having concave or pitted portions 11 for generating head positioning signals or signals indicating copyright data, for example. The perpendicular magnetic recording medium according to the first embodiment includes a soft magnetic layer 2 on the nonmagnetic substrate 1, a magnetic recording layer 3 on the soft magnetic layer 2, and a protection layer 4 on the magnetic recording layer 3.

The nonmagnetic substrate 1 can carry head positioning signals or signals indicating copyright data, or similar data, formed in advance in the form of an uneven level pattern. The conventional aluminum alloy substrate provided with NiP plating or the conventional reinforced glass substrate can be used for the nonmagnetic substrate 1. The uneven level pattern is formed by the photolithographic technique or similar techniques. When a glass material or a plastic resin, such as polycarbonate and polyolefin is used, it is preferable, from the view point of mass-productivity, to manufacture the nonmagnetic substrate 1 by injection molding, using a die having the uneven level pattern formed therein in advance.

Figure 2:
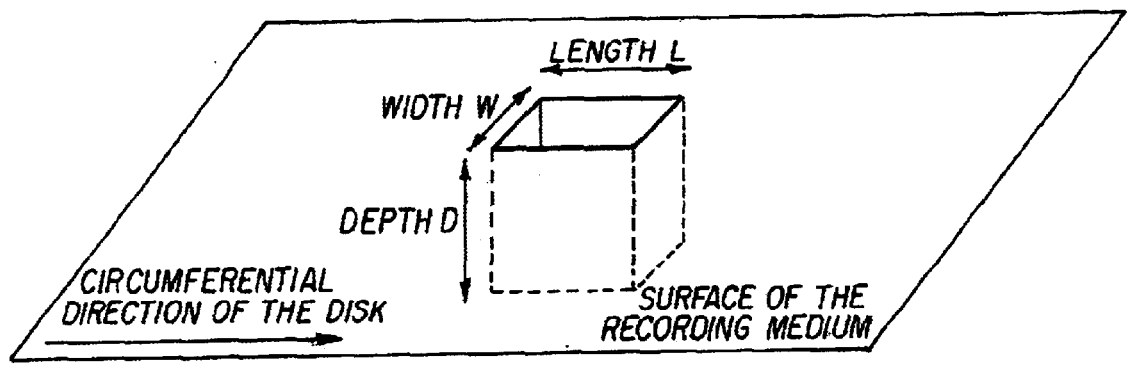
FIG. 2 is a schematic drawing describing the dimensions of the concave portion of the nonmagnetic substrate of FIG. 1.

FIG. 2 is a schematic drawing for describing the dimensions of the concave portion or pit 11 in the nonmagnetic substrate 1. The width W, the length L, and the depth D of the concave portion 11 in the nonmagnetic substrate 1 are defined as described in FIG. 2. According to the invention, the head positioning signals or signals indicating copyright data or other data, for example, are recorded by the concave portions 11 formed in the nonmagnetic substrate 1 as shown in FIGS. 1 and 2, and by the region on the nonmagnetic substrate 1 that is not concave. For orienting the easy axis of magnetization in the concave regions of the soft magnetic layer perpendicular to the soft magnetic layer, it is necessary, as described later, to form the concave portions in the nonmagnetic substrate, such that the dimensions thereof are related with each other at least by the following two relational expressions: W<D and L<D.

Figure 3:
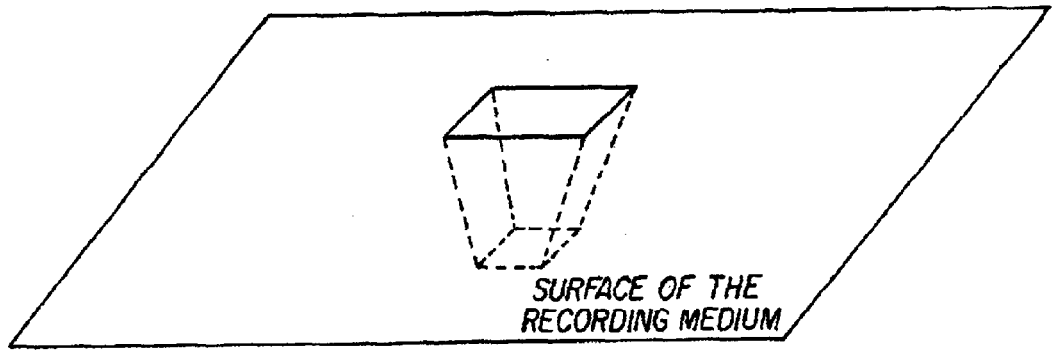
FIG. 3 is a schematic drawing describing the concave portion of the nonmagnetic substrate of a magnetic recording medium according to a second embodiment of the invention, the cross sectional area thereof becoming narrower toward the bottom thereof.

When the cross sectional area of the concave portion 11, which is parallel to the nonmagnetic substrate, becomes narrower toward the bottom thereof, as shown in FIG. 3, the easy axis of magnetization in the concave region of the soft magnetic layer 2 is oriented more effectively perpendicular to the soft magnetic layer 2.

Materials exhibiting a relatively high magnetic permeability, such as a NiFe alloy, a FeSiAl alloy, and an alloy containing cobalt (Co) as its main component are used for the soft magnetic layer 2. Preferably, a magnetic field is applied during the formation of the soft magnetic layer 2 in the direction that orients the easy axis of magnetization of the soft magnetic layer 2 parallel to the soft magnetic layer 2, especially in the radial direction of the magnetic disk. It is necessary to form the soft magnetic layer 2 such that the thickness or depth d thereof is related to the width W and the length L of the concave portions of the nonmagnetic substrate at least by the following two relational expression: W<d and L<d. It is necessary, however, for the depth D of the concave portions to be larger than the thickness d of the soft magnetic layer 2.

The easy axis of magnetization of the soft magnetic layer 2, formed as described above on the nonmagnetic substrate 1 outside the concave portions 11, lies parallel to the soft magnetic layer 2. In contrast, the easy axis of magnetization of the soft magnetic layer 2 inside the concave portion 11, lies perpendicular to the soft magnetic layer 2 due to the effect of shape magnetic anisotropy.

It is necessary to record the signal indicating the position data of the magnetic head and used in the conventional hard disk for the recording length of 1 $\mu$m or longer. It is difficult to form the concave portions deeper than the recording length described above and to form the soft magnetic layer thicker than the recording length described above. However, the magnetic recording medium including the concave portions having the dimensions as described above can be used, when the above described signal is modulated with a higher frequency signal and demodulated after the reproduction by the magnetic head.

The conventional perpendicular magnetization films, such as a Co alloy film including a CoCr film and a CoCrPt film, an amorphous alloy film containing a rare earth element and a transition metal, and an alloy film formed of Co layers and Pd layers or Pt layers laminated alternately, are used for the magnetic recording layer 3. The thickness of the magnetic recording layer 3 is not influential to the performance of the magnetic recording medium according to the invention. The magnetic recording layer 3 is from 5 nm to 50 nm in thickness to generate reproduced signals strong enough but not to impair the sharpness of the magnetic field from the magnetic head. If necessary, a nonmagnetic intermediate layer can be inserted between the soft magnetic layer 2 and the magnetic recording layer 3 to control the structure of the magnetic recording layer 3.

The conventional protection layer such as a layer containing carbon as its main component and from 2 to 10 $\mu$m in thickness is used for the protection layer 4. If necessary, a liquid lubricant layer can be formed on the protection layer 4 to improve the resistance against friction and wear.

Figure 4:
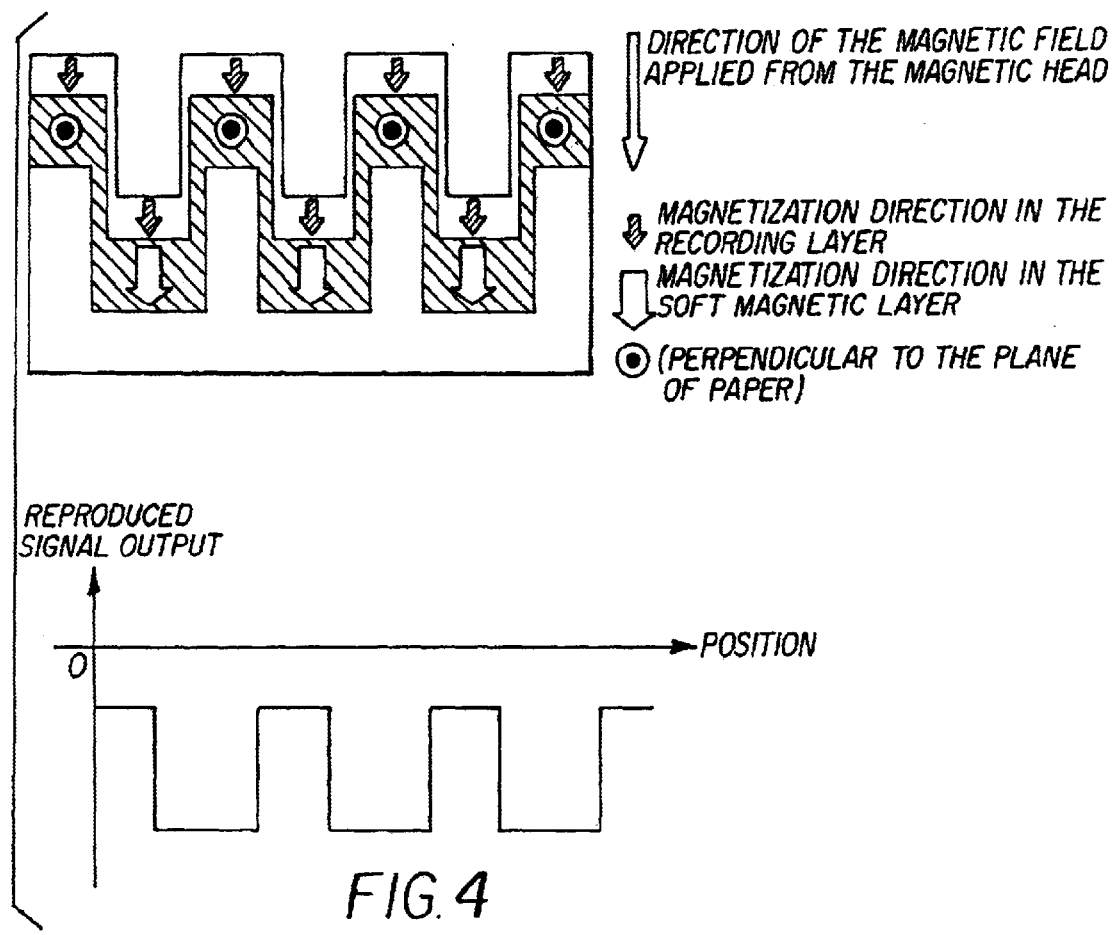
FIG. 4 is a schematic drawing describing the cross section of the magnetic recording medium according to the first embodiment, illustrating the magnetization directions in the respective constituent layers after the magnetic field applied perpendicular to the entire surface of the magnetic recording medium is removed, and the change of the signal reproduced by the magnetic head scanning the surface of the magnetic recording medium.

FIG. 4 is a schematic drawing describing the cross section of the magnetic recording medium illustrating the magnetization directions in the respective constituent layers after the magnetic field applied perpendicular to the entire surface of the magnetic recording medium (indicated by the arrow pointing downward) is removed, and the change of the signal reproduced by the magnetic head scanning the surface of the magnetic recording medium. The magnetization in the magnetic recording layer 3 points downward. The magnetization outside the concave region of the soft magnetic layer 2 lies parallel to the soft magnetic layer 2, that is parallel to the easy axis of magnetization outside the concave regions of the soft magnetic layer 2. The magnetization inside the concave region of the soft magnetic layer 2 points downward, that is, along the direction the magnetic field is applied to, since the easy axis of magnetization inside the concave region lies perpendicular to the soft magnetic layer 2. Since the reproduced signal output changes corresponding to the arrangement of the concave regions and the flat region (outside the concave regions), the arrangement of the concave regions and the flat region can be utilized for the head position data or similar data.

Now the invention will be described hereinafter in connection with the preferred embodiments thereof.

According to a first embodiment, a polycarbonate substrate, 3.5 inches in diameter, formed by injection molding is used for the nonmagnetic substrate 1. Concave portions, the width and the length thereof are 100 nm and the depth thereof is varied from 50 to 200 nm are formed concentrically in the polycarbonate substrate in advance. The concave portions on the same circle are spaced apart for 200 nm from each other. The nonmagnetic substrate 1 is loaded in a sputtering apparatus, and a CoZrNb alloy soft magnetic layer 2 is formed on the nonmagnetic substrate 1 by the magnetron DC sputtering method using a $Co_{83}Zr_7Nb_{10}$ alloy target. The resulting soft magnetic layer 2 is as thick as the depth of the concave portions in the nonmagnetic substrate 1. Subsequently, a Ti intermediate layer of 10 nm in thickness, a $Co_{70}Cr_{20}Pt_{10}$ magnetic recording layer of 30 nm in thickness and a carbon protection layer are formed one by one by sputtering. Finally, a perfluoropolyether liquid lubricant layer of 2 nm in thickness is formed on the carbon protection layer. Thus, a magnetic recording medium according to the first embodiment of the invention is fabricated.

The quality of the signals reproduced from the magnetic recording medium fabricated as described above is evaluated in the following way. Signals are recorded in a spin stand tester on the track in which the concave portions are formed by applying a DC magnetic field downward, perpendicular to the major surface of the medium from a magnetic head, including a writing element of a single pole type and a reading out element of a giant magnetoresistance (GMR) type. Then, the recorded signals are read out using the magnetic head described above. The qualities of the reproduced signals are listed in Table 1 with the depth D of the concave portions as a parameter.

TABLE 1

| Depth $D_s$ (nm) | Reproduced Signal Amplitudes * | Signal Quality |
|---|---|---|
| 50 | 0.1 | X |
| 80 | 0.2 | X |
| 100 | 1 | ○ |
| 150 | 1.2 | ◎ |
| 200 | 1.3 | ◎ |

* THE RATIO BETWEEN THE REPRODUCED SIGNAL AMPLITUDES AT THE SPECIFIED DEPTH $D_s$ AND THE DEPTH D AT 100 NM ($D_s/D_{100}$)

As Table 1 clearly indicates, signals with an excellent quality are reproduced when the depth D of the concave portions is larger than the width and the length thereof, as indicated by a double concentric circle ◎.

FIG. 3 is a schematic drawing illustrating the concave portion in the nonmagnetic substrate of a magnetic recording medium according to a second embodiment of the invention. The magnetic recording medium according to the second embodiment is fabricated in the same way as the magnetic recording medium according to the first embodiment except the shape of the concave portions in the nonmagnetic substrate 1. As shown in FIG. 3, the concave portion according to the second embodiment has an inverted truncated pyramid shape. In other words, the cross sectional area of the concave portion according to the second embodiment, which area is parallel to the nonmagnetic substrate 1, becomes narrower toward the bottom thereof. In detail, the depth D of the concave portion is 150 nm. The width W and the length L of the concave portion are both 100 nm at the top and both 50 nm at the bottom. The magnetic recording medium according to the second embodiment is evaluated in the same way as the magnetic recording medium according to the first embodiment.

Figure 5A:
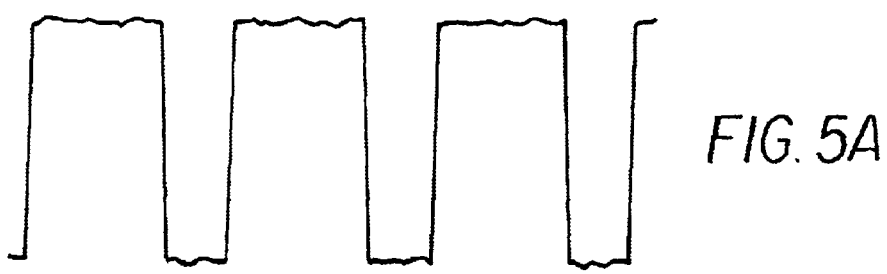
FIG. 5A is a wave form of the reproduced output signal obtained from the magnetic recording medium according to the second embodiment, which includes the concave portions where the bottom area thereof is narrowed.
Figure 5B:
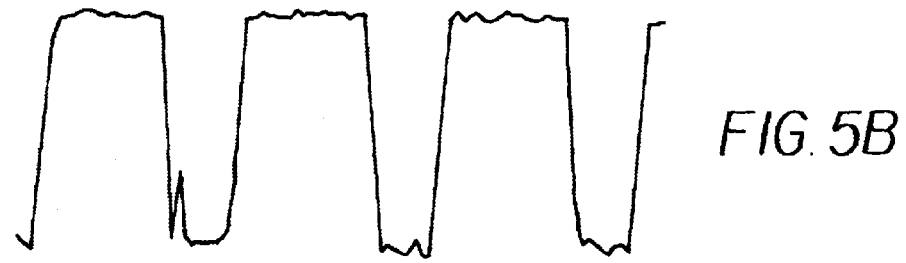
FIG. 5B is a wave form of the reproduced output signal obtained from the magnetic recording medium according to the first embodiment, which includes the concave portions where the bottom area thereof is not narrowed.

FIG. 5A is a wave form of the reproduced output signal obtained from the magnetic recording medium according to the second embodiment where the bottom area of the concave portions is narrowed. FIG. 5B is a wave form of the reproduced output signal obtained from the magnetic recording medium according to the first embodiment where the bottom area of the concave portions is not narrowed.

As FIGS. 5A and 5B indicate, the quality of the output signal reproduced from the medium where bottom area of the concave portions is narrowed is higher than that of the output signal reproduced from the medium where the bottom area of concave portions is not narrowed. Thus, the change in the shape of the concave portion is very effective to improve the performance of the magnetic recording medium. This effect is attributable to the orientation of the magnetization in the soft magnetic layer oriented due to the magnetic anisotropy enhanced by the specific shape of the soft magnetic layer.

As described above, the magnetic recording medium according to the invention does not utilize the magnetization in the magnetic recording layer but utilizes the magnetization in the concave regions of the soft magnetic layer when the magnetic recording medium uses the uneven level pattern on the nonmagnetic substrate for the predetermined signal, such as a head positioning signal and a signal indicating copyright data or the other data. This specific feature of the magnetic recording medium according to the invention facilitates using the magnetic fluxes generated from the concave regions as the signals. When the concave portion of the nonmagnetic substrate has a predetermined shape, the magnetic flux generated from the concave region can be used as the signal. More in detail, when the depth of the concave portion of the nonmagnetic substrate and the thickness of the soft magnetic layer are larger than at least the length and the width of the concave portion, the magnetic fluxes generated from the concave regions can be used as the signals since the easy axis of magnetization in the concave regions of the soft magnetic layer lies perpendicular to the soft magnetic layer due to the shape of the magnetic anisotropy. By narrowing the cross sectional area of the concave portion parallel to the soft magnetic layer toward the bottom thereof, the shape magnetic anisotropy can be enhanced.

The magnetic recording medium formed as described above facilitates to realize a higher recording density due to a higher track density obtained by the improvement of the accuracy of the head positioning signal and due to a higher line recording density obtained by employing the perpendicular magnetic recording method. By not only employing the uneven level pattern for the head positioning signal, but also by recording the other data such as copyright data in the medium, the protection and the management of the recorded data are facilitated.

The magnetic recording medium according to the invention having the structure as described above exhibits much benefits since the magnetization in the concave regions of the soft magnetic layer and the magnetization in the entire magnetic recording layer are oriented perpendicular to the major surface of the magnetic recording medium (upward or downward) and since the magnetization in the region of the soft magnetic layer outside the concave regions is oriented parallel to the soft magnetic layer (that is along the easy axis of magnetization of the soft magnetic layer) by applying a magnetic field perpendicular to the major surface of the magnetic recording medium (upward or downward) and by removing the magnetic field to magnetically write the signals corresponding to the uneven level pattern on the magnetic recording medium.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-232785, in its entirety, including the drawings, claims, and the specification thereof, is incorporated herein by reference.

What is claimed is:

1. A perpendicular magnetic recording medium comprising:
   a nonmagnetic substrate;
   a soft magnetic layer on the nonmagnetic substrate;
   a magnetic recording layer above the soft magnetic layer, the magnetic recording layer comprising perpendicular magnetizations that extend perpendicular to a major surface or plane of the magnetic recording layer and representing data signals; and
   a protection layer on the magnetic recording layer,
   wherein the nonmagnetic substrate has pits having predetermined length, width, and depth, the pits forming an uneven level pattern thereon,
   wherein the soft magnetic layer extends into the pits, and the depth of each of the pits is larger than the respective width and the length thereof to configure the easy axis of magnetization of the soft magnetic layer in the region of the pits to lie perpendicular to the major surface of the substrate due to shape magnetic anisotropy, and
   wherein the soft magnetic layer in the pits generates a magnetic flux for generating a predetermined signal.

2. The perpendicular magnetic recording medium according to claim 1, wherein the cross sectional area of each of the pits along the major surface of the perpendicular magnetic recording medium becomes narrower toward the bottom thereof.

3. The perpendicular magnetic recording medium according to claim 1, wherein the predetermined signal comprises a head positioning signal.

4. The perpendicular magnetic recording medium according to claim 1, wherein the predetermined signal comprises a head positioning signal.

5. The perpendicular magnetic recording medium according to claim 2, wherein the predetermined signal comprises a head positioning signal.

6. The perpendicular magnetic recording medium according to claim 1, wherein the predetermined signal comprises a signal indicating copyright data.

7. The perpendicular magnetic recording medium according to claim 2, wherein the predetermined signal comprises a signal indicating copyright data.

8. The perpendicular magnetic recording medium according to claim 1, wherein each of the pits has an inverted-truncated trapezoidal profile.

* * * * *